T. J. GORMAN, Jr.
FASTENING FOR RAIL JOINTS.
APPLICATION FILED JUNE 7, 1915.
1,204,563.
Patented Nov. 14, 1916.
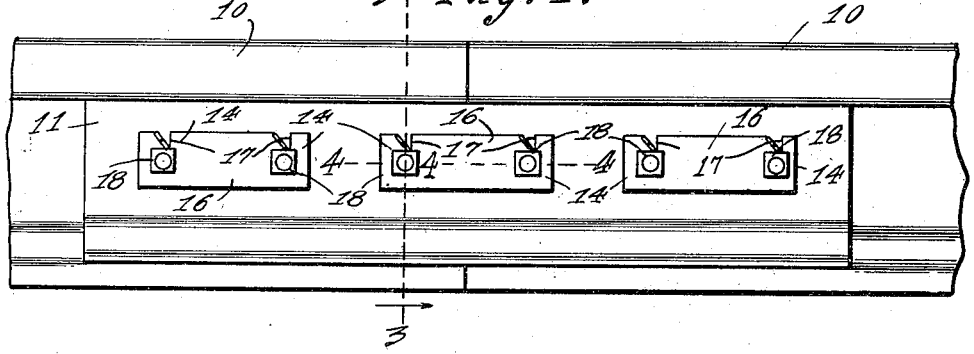
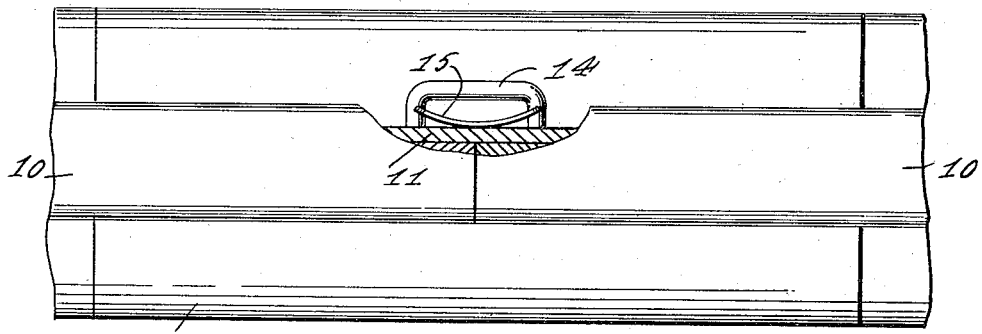
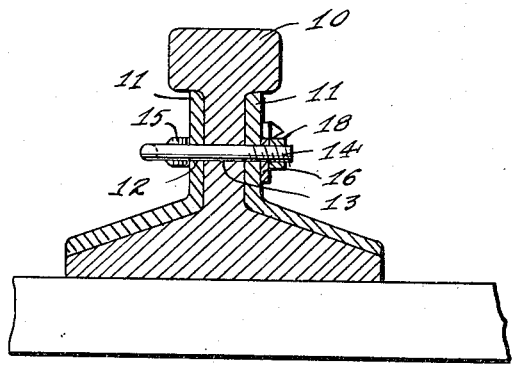
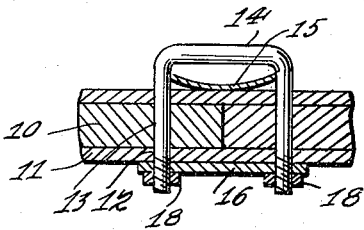
Witnesses
Inventor
T. J. Gorman Jr.
Attorneys

UNITED STATES PATENT OFFICE.

THOMAS J. GORMAN, JR., OF NEWARK, NEW JERSEY.

FASTENING FOR RAIL-JOINTS.

1,204,563.  Specification of Letters Patent.  Patented Nov. 14, 1916.

Application filed June 7, 1915. Serial No. 32,687.

*To all whom it may concern:*

Be it known that I, THOMAS J. GORMAN, Jr., a citizen of the United States, residing at Newark, in the county of Essex, State of New Jersey, have invented certain new and useful Improvements in Fastenings for Rail-Joints; and I do hereby declare the following to be a full, clear, and exact description of the invention, such as will enable others skilled in the art to which it appertains to make and use the same.

This invention relates to improvements in rail joints, and particularly to novel and simple means for securing the ends of a pair of rails together.

The principal object of the invention is to provide a device of this character which is simple in construction and effective in operation to hold the ends of the rails against movement longitudinally away from each other.

Another object is to provide novel means for locking the device against displacement.

Other objects and advantages will be apparent from the following description when taken in connection with the accompanying drawing.

In the drawing: Figure 1 is a side elevation of a rail joint showing my invention applied thereto, Fig. 2 is a top plan view, Fig. 3 is a vertical transverse sectional view on the line 3—3 of Fig. 1, Fig. 4 is a horizontal longitudinal sectional view on the line 4—4 of Fig. 1.

Referring particularly to the accompanying drawing, 10—10 represents a pair of rails joined together by my invention. Disposed on opposite sides of the meeting ends of the rails are the ordinary fish plates 11, each provided with a plurality of openings 12 alining with openings 13 in the rail ends. Passed through the pair of openings are the legs of the U-shaped bolts 14, the ends of said legs passing first through notches in the end of a bowed spring 15 disposed between one of the fish plates and the bight portion of the bolt, with its convexed side against the fish plate. Slipped on to the threaded ends of the legs of the bolt and against the other fish plate is a spring metal plate 16, this plate being cut inwardly from opposite sides and adjacent opposite ends, as at 17.

Engaged on the ends of the bolt outwardly of the plate 16 are the nuts 18. When the nuts are screwed home, the legs of the bolts are moved through the plates and rails so that the spring plate 15 will be brought into stress, thus forming a yieldable connection laterally of the joint. After the bolts have been screwed home, the portions of the plate 16 at the outer sides of the cuts 17 are turned inwardly so as to be engaged by the corners of the nut to prevent retrograde movement thereof. These bent corners will yield under the pressure of the corners of the nuts when the nuts are being screwed on to the bolt.

What is claimed is:

The combination with the meeting ends of a pair of rails; fish plates disposed on opposite sides thereof, said fish plates and rails having registering pairs of openings, the openings of one pair being formed one in one rail end and the other in the other rail end, U-bolts having their legs passed through the openings and having their bights in spaced relation to one of the fish plates, means for independently adjusting the position of the legs of independent U-bolts, and springs each having notched ends engaging the legs of a bolt and being bowed to rest against the fish plate adjacent the bight of such bolt.

In testimony whereof, I affix my signature, in the presence of two witnesses.

THOMAS J. GORMAN, JR.

Witnesses:
W. J. PATTEN,
M. E. HYNES.

Copies of this patent may be obtained for five cents each, by addressing the "Commissioner of Patents, Washington, D. C."